(12) United States Patent
Wong

(10) Patent No.: US 9,203,479 B2
(45) Date of Patent: Dec. 1, 2015

(54) TRANSMISSION CONTROL

(75) Inventor: Shin Horng Wong, Chippenham (GB)

(73) Assignee: Alcatel Lucent, Boulogne-Billancourt (FR)

(*) Notice: Subject to any disclaimer, the term of this patent is extended or adjusted under 35 U.S.C. 154(b) by 204 days.

(21) Appl. No.: 13/878,360

(22) PCT Filed: Sep. 8, 2011

(86) PCT No.: PCT/EP2011/004513
§ 371 (c)(1),
(2), (4) Date: Jul. 1, 2013

(87) PCT Pub. No.: WO2012/045382
PCT Pub. Date: Apr. 12, 2012

(65) Prior Publication Data
US 2013/0272237 A1 Oct. 17, 2013

(30) Foreign Application Priority Data
Oct. 8, 2010 (EP) .................................... 10360036

(51) Int. Cl.
*H04B 7/02* (2006.01)
*H04B 7/04* (2006.01)
*H04B 7/06* (2006.01)

(52) U.S. Cl.
CPC .............. *H04B 7/02* (2013.01); *H04B 7/022* (2013.01); *H04B 7/0404* (2013.01);
(Continued)

(58) Field of Classification Search
None
See application file for complete search history.

(56) References Cited

U.S. PATENT DOCUMENTS

| 6,983,127 B1* | 1/2006 | Da Torre et al. ........... 455/67.11 |
| 2003/0125040 A1* | 7/2003 | Walton et al. ............... 455/454 |

(Continued)

FOREIGN PATENT DOCUMENTS

| JP | 2007-134844 | 5/2007 |
| JP | 2008-515254 | 5/2008 |

(Continued)

OTHER PUBLICATIONS

Notice of Reason for Refusal for corresponding Japanese Application No. 2013-532057, dated May 29, 2014, 4 pages.

(Continued)

*Primary Examiner* — Ian N Moore
*Assistant Examiner* — Brian T Le
(74) *Attorney, Agent, or Firm* — Fay Sharpe LLP

(57) ABSTRACT

User equipment, a computer program product and method of setting antenna transmission weightings of user equipment in a wireless telecommunication network. The user equipment (vE1) is operable to transmit on at least two antenna and communicate with at least two base stations (NB1, NB2) in its active set. The method employed by the user equipment and computer program product comprises the steps of: receiving an indication of preferred antenna transmission weightings (W1,W2) from at least two base stations in said active set associated with said user equipment, calculating from said received indications of preferred antenna transmission weightings, an indication of compromise antenna transmission weightings which minimize the difference between said indication of compromise antenna transmission weightings and said indication of preferred antenna transmission weightings received from the base stations in said active set and setting said antenna transmission weightings in accordance with said calculated indication of compromise antenna transmission weightings.

8 Claims, 11 Drawing Sheets

(52) U.S. Cl.
CPC ........... *H04B 7/0634* (2013.01); *H04B 7/0608* (2013.01); *H04B 7/0617* (2013.01); *H04B 7/0623* (2013.01); *H04B 7/0639* (2013.01); *H04B 7/0641* (2013.01); *H04B 7/0682* (2013.01)

(56) References Cited

U.S. PATENT DOCUMENTS

| | | | |
|---|---|---|---|
| 2006/0072629 A1* | 4/2006 | Kent et al. | 370/516 |
| 2006/0079288 A1* | 4/2006 | Lindoff | 455/562.1 |
| 2007/0104165 A1 | 5/2007 | Hanaoka et al. | |
| 2007/0142074 A1 | 6/2007 | Black et al. | |
| 2008/0227472 A1 | 9/2008 | Harel et al. | |
| 2009/0092087 A1* | 4/2009 | Walton et al. | 370/329 |

FOREIGN PATENT DOCUMENTS

| | | |
|---|---|---|
| JP | 2009-521194 | 5/2009 |
| WO | WO 2010/072254 A1 | 7/2010 |

OTHER PUBLICATIONS

International Search Report for PCT/EP2011/004513 dated Jan. 24, 2012.

* cited by examiner

Multipath propagation

Fast fading in time for a UE moving at 3 kmph

High level implementation of UE uplink transmit diversity

Conflicting weights from cells in Active Set

High level implementation of a 2 branch SATD UE

N=16 weight vectors

Illustration of phase φ and δ

Loss due to UE using a different weight from the NB preferred weight in Pedestrian channels Loss due to UE using a different weight from the NB preferred weight in Vehicular channels The difference in weight vector Δw I-phase
Wrap around of the phase $\phi$

TRANSMISSION CONTROL

FIELD OF THE INVENTION

The present invention relates to a method of setting antenna transmission weightings of user equipment in a wireless telecommunication network, user equipment and a computer program product.

BACKGROUND

Wireless telecommunications systems are known. In those known systems, radio coverage is provided to user equipment, for example, mobile telephones, by geographical area. A base station is located in each geographical area to provide the required radio coverage. User equipment in the area served by a base station receives information and data from the base station and transmits information and data to the base station. In a high-speed packet access (HSPA) telecommunications network, data and information is sent between user equipment and a base station in data packets on a radio frequency carrier.

Information and data transmitted by the base station to the user equipment occurs on radio frequency carriers known as downlink carriers. Information and data transmitted by user equipment to the base station occurs on radio frequency carriers known as uplink carriers.

In known wireless HSPA telecommunication systems, user equipment can move between geographical base station coverage areas. Service provided to user equipment is overseen by a radio network controller (RNC). The radio network controller communicates with user equipment and base stations and determines which base station, and which cell of the geographical area served by that base station each user equipment is primarily connected to (known as the "serving cell"). Furthermore, a radio network controller acts to control and communicate with a base station and user equipment when user equipment moves from the geographical area served by one base station to a geographical area served by another base station.

A signal transmitted between user equipment and a base station over a radio channel typically experiences many propagation paths, for example, due to reflection, before arriving at a base station receiver. The signal carried on those paths each arrive at a different time, power and phase at the receiver. The sum of the different signal propagation paths at the receiver causes the total signal received to attenuate or amplify depending on the phases of the different received propagation paths.

Changes to the transmitter position or the transmitter surroundings causes the multiple propagation path signals to change, leading to fluctuation in the signal at the receiver. This characteristic is known as multipath fading or fast fading. Fast fading causes the signal to fluctuate over even a short time span. A signal may suffer significant attenuation due to fading or deep fade. A signal that has undergone deep fade may not be decodable.

Transmit diversity (TxDiv), is a method according to which a signal can be transmitted over two or more antennas. If a signal transmitted by a first antenna experiences a deep fade, the same signal transmitted on another antenna, typically experiences different radio conditions and propagation paths and may arrive with good quality.

Uplink transmit diversity at user equipment requires more than one antenna to be provided, and that a signal may be sent to a base station on one or more of those antenna(s). The signal arriving at a base station from two antennas may be combined by the base station and can thus result in a diversity gain at the base station of the transmitted signal. Further, if the signal transmitted using one antenna is particularly affected by fast fading, a signal transmitted using another antenna may be less affected by fast fading.

The requirements of a user having uplink transmission diversity may be contrary to other requirements in place within a network. Those requirements may conflict, leading to decreased efficiency of data transfer within a wireless telecommunication network as a whole.

Accordingly, it is desired to improve the robustness of a wireless telecommunications network having uplink transmit diversity functionality.

SUMMARY

According to a first aspect, there is provided a method of setting antenna transmission weightings of user equipment in a wireless telecommunication network, the user equipment being operable to transmit on at least two antenna and operable to communicate simultaneously with at least two base stations from an active set associated with the user equipment, the method comprising the steps of:
  receiving an indication of preferred antenna transmission weightings from the at least two base stations in the active set,
  calculating an indication of compromise antenna transmission weightings which minimise a difference between the indication of compromise antenna transmission weightings and the indication of preferred antenna transmission weightings; and
  setting the antenna transmission weightings in accordance with the indication of compromise antenna transmission weightings.

The first aspect recognises that transmit diversity (TxDiv), is a method according to which a signal can be transmitted over two or more antennas, and that method may allow for improved communication between user equipment and a base station by offering a chance to overcome or mitigate the likelihood of fast fading degrading a signal to the extent it is no longer decodable. If a signal transmitted by a first antenna experiences a deep fade, the same signal transmitted on another antenna, typically experiences different radio conditions and propagation paths and may arrive with good quality.

In an implementation of uplink transmit diversity at user equipment, a signal S is duplicated and each copy is multiplied by a weight. Signals $S_1$ and $S_2$ are produced by multiplying weight $W_1$ and $W_2$ respectively by the copy of signal S. Each of those signals is then transmitted via a different antenna. The signals $S_1$ and $S_2$ as received at a base station are combined by the base station and can thus result in a diversity gain at the base station of signal S.

TxDiv schemes can use various methods to determine the weights $W_1$ and $W_2$. It is possible to allow a base station to determine appropriate weights $W_1$ and $W_2$ directly rather than allowing user equipment to choose. Since the radio channels that signals $S_1$ and $S_2$ propagate through can be estimated at a base station (BS), the base station is able to determine the weights $W_1$ and $W_2$ that can maximize the received quality of signal S, after combining signal $S_1$ and $S_2$, at that base station. The choice of weights $W_1$ and $W_2$ selected by the base station will need to be explicitly signalled to user equipment.

A HSPA network allows for increased data throughput in the uplink by allowing user equipment to communicate with more than one base station. That is to say, any packet transmitted by user equipment may be received at more than one base station. The network, and specifically RNC, is able to combine the packets received by different base stations, and thus can help ensure communication between user equipment and the network as a whole is more robust. That scenario is known as soft handover (SHO) and comprises a collection of cells, supported by one or more base stations, communicating with one user equipment.

The cells participating in SHO of a UE belong to an "Active Set" of the UE. In HSPA, within the Active Set, there will be one main cell serving the UE, referred to as a "serving cell". Other cells that are not the serving cells within the active set are called the non-serving cells. If the cells in the Active Set belong to the same base station as that which hosts the serving cell, this is termed "Softer Handover".

In a High Speed Uplink Packet Access (HSUPA) network having uplink transmission diversity functionality, an uplink data transmission from user equipment will typically use SHO, thus allowing for more robust communication with the network as a whole.

Uplink Transmission Diversity (TxDiv) weights are determined based on radio channels between user equipment and a receiver at a base station. Since the radio channels between the UE antennas and each of the cells (NB receive antennas) in the Active Set are different, each cell, or base station, with which user equipment is in communication will typically request different TxDiv weights to try to optimize communication between the user equipment and itself.

User equipment is, however, typically operable to apply only one set of weights to its transmission. If an overall inappropriate weight is chosen, based on the recommendation of a single base station in a user equipment active set, the weights used may degrade the reception of some cells, leading to an overall loss in network efficiency.

The first aspect recognises that rather than simply being a slave to a single base station, it may be possible to balance the requirements of HSPA and a transmit diversity scheme to optimise the efficiency and operation of the network as a whole. Accordingly, a method of balancing the transmission weighting requests received from the base stations in the active set of user equipment may allow some compromise to be reached, thereby allowing for any detriment to one base station caused by selection of a weighting which has not been requested by that base station to be compensated for my moving the selected weighting closer to a weighting selected by another base station in the active set of the user equipment.

It will be appreciated that various methods may be employed to determine a suitable compromise, but those methods seek to minimise the difference between the weightings implemented and the various weightings being requested.

In one embodiment, the step of calculating comprises the step of: minimising the mean squared distance between the indication of compromise antenna transmission weightings and the indication of preferred antenna transmission weightings received from the base stations in the active set.

Accordingly, the difference between all received requested weightings and the selected weighting is minimised, thereby reaching a numerical compromise between all base stations in the active set requesting transmission diversity weightings.

In one embodiment, the step of calculating comprises the step of: averaging the indication of preferred antenna transmission weightings received from the base stations in the active set. Accordingly, the compromise weightings may simply represent an average of all requested weightings.

In one embodiment, the step of calculating comprises the step of: calculating the mode preferred antenna transmission weightings received from the base stations in the active set. Accordingly, the method selects the most requested weighting from available possible weightings. If more than one weighting selection is determined to be the mode, ie if two weightings are selected with an equal frequency, the method may operate to randomly select one of the modal weighting selections.

In one embodiment, the step of calculating further comprises the steps of: assigning a weighting to the indication of preferred antenna transmission weightings from each base station in the active set, the weighting being determined based upon an indication of the relative importance of each base station in the active set to operation of the user equipment within the network. Accordingly, those base stations which are more integral to efficient operation of the user equipment within a wireless telecommunication network are given priority when determining a compromise weighting for implementation, thereby mitigating the change that implementation of a compromise weighting will unnecessarily disrupt the operation of a wireless communication network.

In one embodiment, the weighting is assigned based upon an indication of received pilot signal strength from the base stations in the active set at the user equipment.

Accordingly, those base stations which appear to be closest, or appear to have strongest communication links with the user equipment may be assigned a higher importance, resulting in the compromise weighting favouring their choice of antenna weightings. Accordingly, a base station in the active set, but having a weak communication link with the user equipment has less significance to the calculation of compromise antenna weightings.

In one embodiment, the weighting takes account of which of the base stations in the active set is responsible for providing the user equipment serving cell. Accordingly, the serving cell may be afforded a greater weighting that a non serving cell. Furthermore, in one embodiment, the serving cell may determine the compromise weightings implemented by the user equipment.

In one embodiment, the indication of the preferred antenna transmission weightings comprises an indication of relative phase shift between transmissions of a signal on the at least two antenna. It will be appreciated that each base station may be operable to transmit a desired indication of relative phase and amplitude for each antenna at said user equipment. Such an arrangement would, however, lead to high signalling data traffic across the wireless network. The base station may instead transmit indicators of desired phase and/or amplitude, those indicators comprising, for example, an index which causes user equipment to look up the relative weightings in a locally stored code book or similar. Accordingly, the indication may comprise and indication of relative phase shift between user equipment antenna. In one embodiment, the indication of the preferred antenna transmission weightings comprises an indication of an amplitude shift between transmissions of a signal on the at least two antenna.

In one embodiment, the indication of preferred antenna transmission weightings comprises an indication of antenna selection. Accordingly, a base station may indicate, and transmit and indication of which antenna is transmitting a signal which is being received most reliably, and thus experiencing better radio propagation conditions.

A second aspect provides a computer program product operable, when executed on a computer, to perform the method of the first aspect.

A third aspect provides user equipment operable to set antenna transmission weightings in a wireless telecommunication network, the user equipment being operable to transmit using at least two antenna and operable to communicate simultaneously with at least two base stations in an active set associated with the user equipment, the user equipment comprising:

reception logic operable to receive an indication of preferred antenna transmission weightings from the at least two base stations in the active set, calculation logic operable to calculate an indication of compromise antenna transmission weightings which minimise a difference between the indication of compromise antenna transmission weightings and the indication of preferred antenna transmission weightings; and implementation logic operable to set the antenna transmission weightings in accordance with the calculated indication of compromise antenna transmission weightings.

In one embodiment, the calculation logic is operable to minimise the mean squared distance between the indication of compromise antenna transmission weightings and the indication of preferred antenna transmission weightings received from the base stations in the active set.

In one embodiment, the calculation logic is operable to average the indication of preferred antenna transmission weightings received from the base stations in the active set.

In one embodiment, the calculation logic is operable to calculate the mode preferred antenna transmission weightings received from said base stations in said active set.

In one embodiment, the calculation logic is operable to assign a weighting to the indication of preferred antenna transmission weightings from each base station in the active set, the weighting being determined based upon an indication of the relative importance of each base station in the active set to operation of the user equipment within the network.

In one embodiment, the weighting is assigned based upon an indication of received pilot signal strength from the base stations in the active set at the user equipment.

In one embodiment, the weighting takes account of which of the base stations in the active set is responsible for providing the user equipment serving cell.

In one embodiment, the indication of said preferred antenna transmission weightings comprises an indication of relative phase shift between transmissions of a signal on the at least two antenna.

In one embodiment, the indication of the preferred antenna transmission weightings comprises an indication of an amplitude shift between transmissions of a signal on the at least two antenna.

In one embodiment, the indication of the preferred antenna transmission weightings comprises an indication of antenna selection.

Further particular and preferred aspects are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings, in which.

DETAILED DESCRIPTION OF THE DRAWINGS

Figure 1:
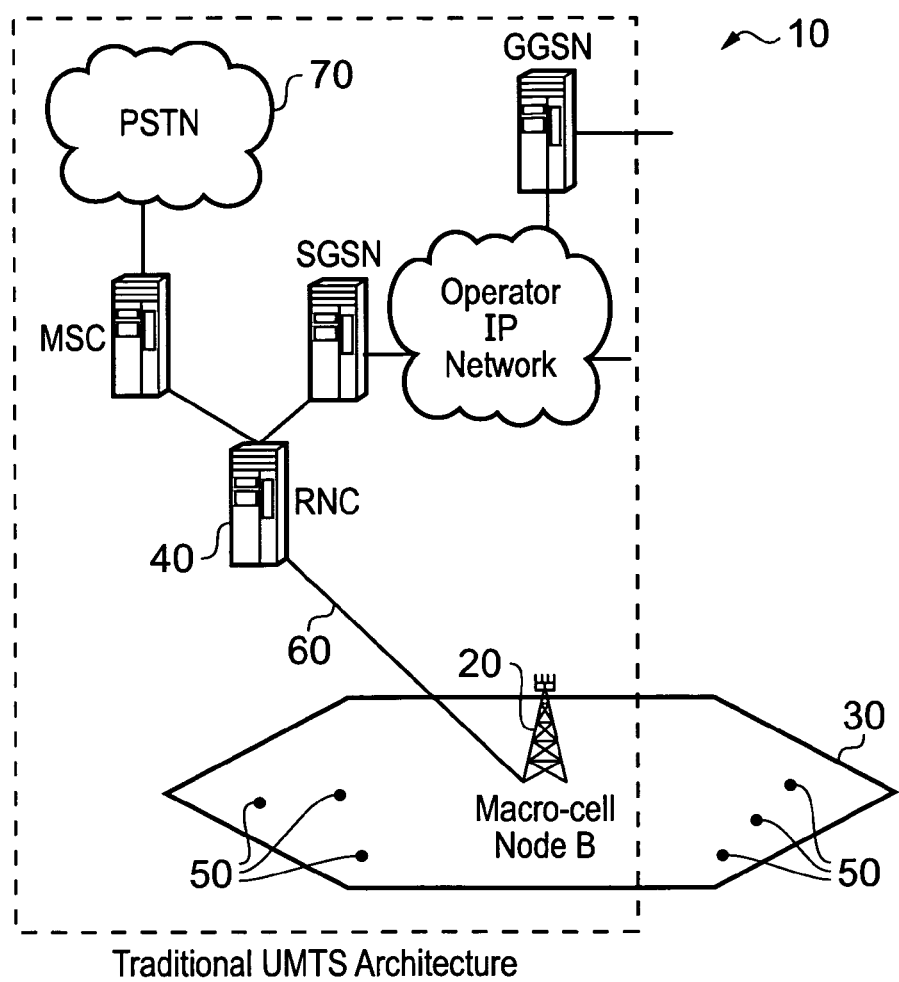
FIG. 1 illustrates a wireless telecommunications system according to one embodiment.

FIG. 1 illustrates a wireless telecommunications system 10 according to one embodiment. User equipment 50 roam through the wireless telecommunications system. Base stations 20 are provided which support areas of radio coverage 30. A number of such base stations 20 are provided and are distributed geographically in order to provide a wide area of coverage to user equipment 50. When user equipment is within an area served by a base station 30, communications may be established between the user equipment and the base station over associated radio links. Each base station typically supports a number of sectors within the geographical area of service 30.

Typically a different antenna within a base station supports each associated sector. Accordingly, each base station 20 has multiple antennas and signals sent through the different antennas are electronically weighted to provide a sectorised approach. Of course, it will be appreciated that FIG. 1 illustrates a small subset of the total number of user equipment and base stations that may be present in a typical communications system.

The radio access network of the wireless communications system is managed by a radio network controller (RNC) 40. The radio network controller 40 controls operation of the wireless communications system by communicating with a plurality of base stations over a backhaul communications link 60. The network controller also communicates with user equipment 50 via each base station.

A radio network controller 60 maintains a neighbour list which includes information about geographical relationships between sectors supported by base stations 20. In addition, the radio network controller 60 maintains location information which provides information on the location of user equipment 50 within the wireless communication system 10. The radio network controller is operable to route traffic via circuit switched and packet switched networks. Hence, a mobile switching centre is provided with which the radio network controller may communicate. The mobile switching centre can communicate with a circuit switched network such as a public switched telephone network (PSTN) 70. Similarly, a network controller can communicate with service general package radio service support nodes (SGSNs) and a gateway general packet support node (GGSN). The GGSN can communicate with a packet switched core such as for example, the Internet.

User equipment 50 typically transmits information and data to a base station 20 so that it can be re-routed within a wireless telecommunications network. User equipment may, for example, need to transmit data to the base station in order to relay text messages, voice information when a user is using the equipment to make a telephone call, or other data. The base station 20, in combination with parameters set by the radio network controller 40, allocates resources to user equipment in a manner that aims to optimise operation of the wireless telecommunications network 10.

Figure 2:
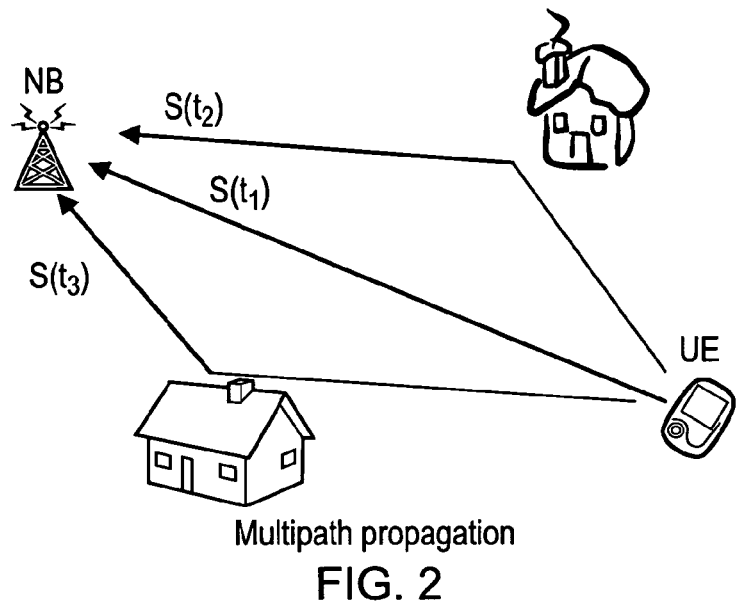
FIG. 2 illustrates schematically typical propagation paths between a transmitter and a receiver.

FIG. 2 illustrates schematically typical propagation paths between a transmitter, in this case, user equipment 50 and a receiver on a base station 20. A signal transmitted over a radio channel typically experiences many propagation paths, for example, due to reflection, before arriving at a receiver. Those signal paths are represented as $S(t_1)$, $S(t_2)$, and $S(t_3)$ in FIG. 2, and each arrive at different time, power and phase at the receiver. The sum of the different signal propagation paths at the receiver causes the total signal received to attenuate or amplify depending on the phases of the different received propagation paths.

Changes to the transmitter position or the transmitter surroundings causes the multiple propagation path signals to change, leading to fluctuation in the signal at the receiver. This characteristic is known as multipath fading or fast fading.

Figure 3:
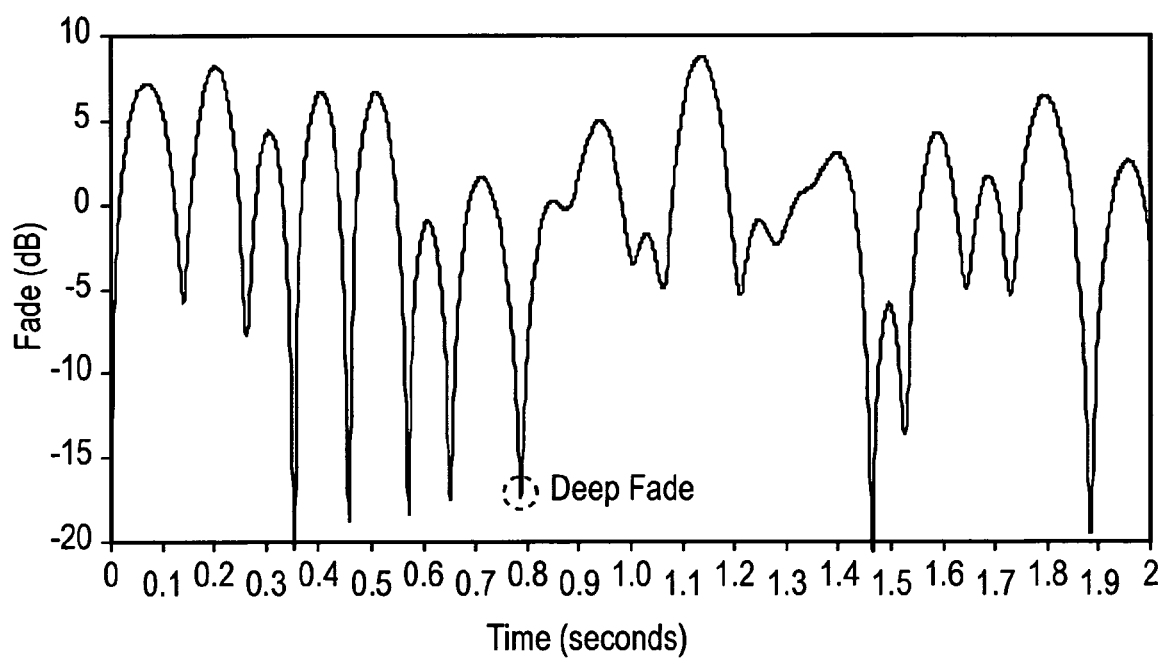
FIG. 3 illustrates fast fading of a signal power for user equipment moving at 3 kmph for a signal operating in 2000 Mhz.

FIG. 3 illustrates fast fading of a signal power for user equipment moving at 3 kmph for a signal operating in 2000 MHz. Fast fading causes the signal to fluctuate over even a short time span. A signal may suffer significant attenuation due to fading or deep fade. A deep fade is shown in FIG. 3, and is ringed by a circle. That deep fade attenuates the signal by 17 dB. A signal that has undergone deep fade may not be decodable.

Transmit diversity (TxDiv), is a method according to which a signal can be transmitted over two or more antennas. If a signal transmitted by a first antenna experiences a deep fade, the same signal transmitted on another antenna, typically experiences different radio conditions and propagation paths and may arrive with good quality.

Figure 4:
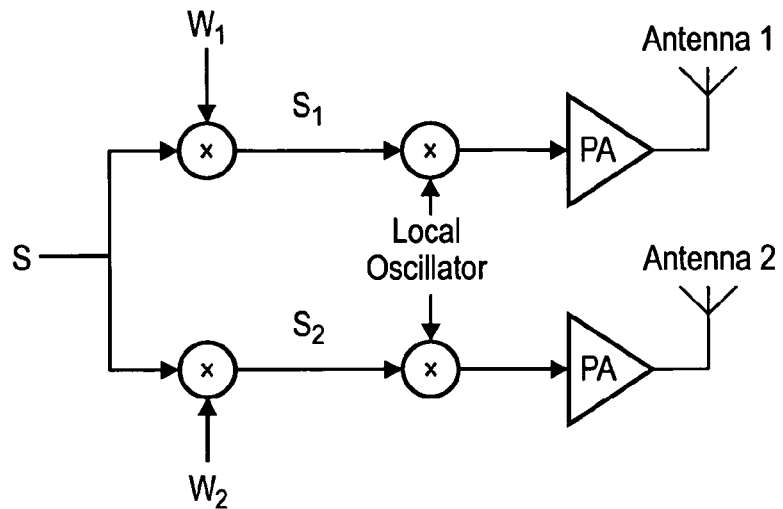
FIG. 4 illustrates schematically an implementation of uplink transmit diversity at user equipment according to one embodiment.

FIG. 4 illustrates schematically an example implementation of uplink transmit diversity at user equipment having two transmit antennas. As shown in FIG. 4, a signal S is duplicated and each copy is multiplied by a weight. Signals $S_1$ and $S_2$ are produced by multiplying weight $W_1$ and $W_2$ respectively by the copy of signal S. Each of those signals is then transmitted via a different antenna. The signals $S_1$ and $S_2$ as received at a base station are combined by the base station and can thus result in a diversity gain at the base station of signal S.

Possible TxDiv schemes use an open loop method to determine the weights $W_1$ and $W_2$, and determination of those weights at user equipment is based on received Transmit Power Control (TPC) commands issued by a serving base station (BS). Since TPC is used for the purpose of power control, the indirect use of TPC to determine the TxDiv weights does not give a true reflection of the uplink radio condition and the chosen weights may have impact on non-serving cells, leading to small gains.

It is possible to allow a base station to determine appropriate weights $W_1$ and $W_2$ instead of user equipment. The radio channels that signals $S_1$ and $S_2$ propagate through can be estimated at a base station (BS) and once the radio channels are known, the base station is able to determine weights $W_1$ and $W_2$ that can maximize the received quality of signal S, after combining signal $S_1$ and $S_2$. It is expected that such a scheme will offer higher gain than that offered by open loop TxDiv utilizing TPC commands. The choice of weights $W_1$ and $W_2$ selected by the base station will need to be explicitly signalled to user equipment.

A HSPA network allows for increased data throughput in the uplink by allowing user equipment to communicate with more than one base station. That is to say, any packet transmitted by user equipment may be received at more than one base station. The network, and specifically RNC, is able to combine the packets received by different base stations, and thus can help ensure communication between user equipment and the network as a whole is more robust. That scenario is known as soft handover (SHO) and comprises a collection of cells, supported by one or more base stations, communicating with one user equipment.

The cells participating in SHO of a UE belong to an "Active Set" of the UE. In HSPA, within the Active Set, there will be one main cell serving the UE, referred to as a "serving cell". Other cells that are not the serving cells are called the non-serving cells. If the cells in the Active Set belong to the same base station as that which hosts the serving cell, this is termed "Softer Handover".

In a High Speed Uplink Packet Access (HSUPA) network having uplink transmission diversity functionality, an uplink data transmission from user equipment will typically with to use SHO, thus allowing for more robust communication with the network as a whole.

Uplink Transmission Diversity (TxDiv) weights are determined based on radio channels between user equipment and a receiver at a base station. Since the radio channels between the UE antennas and each of the cells (NB receive antennas) in the Active Set are different, each cell will request different TxDiv weights from given user equipment.

User equipment is, however, typically operable to apply only one set of weights to its transmission. If an overall inappropriate weight is chosen, based on the recommendation of a single base station in a user equipment active set, the weights used may degrade the reception of some cells.

Figure 5:
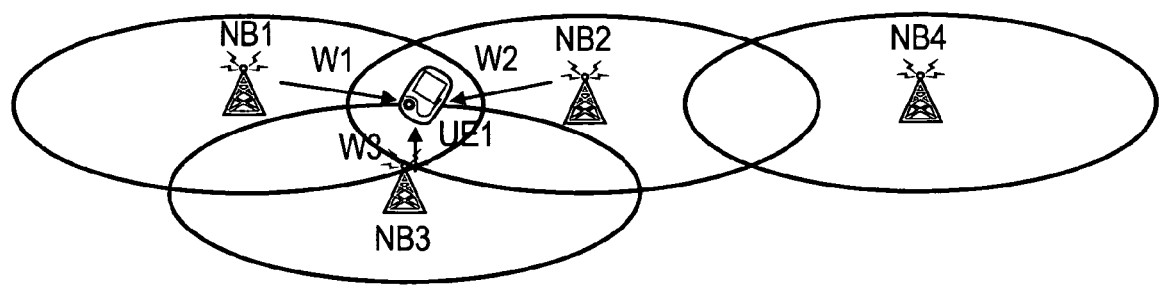
FIG. 5 illustrates schematically user equipment operating in soft handover.

FIG. 5 illustrates schematically user equipment operating in soft handover. As shown in FIG. 5, NB1, NB2 and NB3 belong to the Active Set of UE1. UE1 is outside the coverage of NB4 and hence, NB4 is not in the Active Set of UE1. In order to implement uplink transmit diversity at user equipment UE1, each base station in the active set makes a transmission weighting recommendation, based on optimizing the chances of receiving a packet successfully at itself. NB1 selects W(1), NB2 selects W(2) and NB3 selects W(3). The user equipment can only implement one weighting. Aspects address the issue of how to determine suitable transmission weights for implementation by user equipment in SHO to use in uplink TxDiv.

Uplink Transmit Diversity—Overview

The set of values that the weights $W_1$ and $W_2$, shown in FIG. 4, may take is infinite. A large number of bits would be required to feedback the actual values of the weights $W_1$ and $W_2$ to user equipment, causing a huge amount of network traffic. To minimize unnecessary signalling within the network 10, a finite set of weight values is chosen and a base station feeds back to user equipment only an index to a set of values (ie, a reference in a look up table).

Let W be the set of weights, for user equipment having two transmit antennas, as follows:

$$W = \left\{ \begin{pmatrix} W_1(1) & W_2(1) \\ W_1(2) & W_2(2) \\ \vdots & \vdots \\ W_1(n) & W_2(n) \\ \vdots & \vdots \\ W_1(N) & W_2(N) \end{pmatrix} \right\}$$

Where, n is the index to a pair of weight $W_1$ and $W_2$. N is number of possible pairs of weights that a base station may choose.

A base station will typically evaluate each of the N pair of weights in the set W against the estimated radio channel to find the best pair of weights to be use in the next uplink transmission. A base station then signals the "best" index n to user equipment. User equipment is provided with a look up table comprising the same set of weights, W and will apply the weights indicated by the index n to the transmit signal for each antenna. Hence, the number of bits required in the feedback channel is the number of bits required to represent N indices.

Transmit Diversity Schemes

In order to implement transmit diversity at user equipment, both Switched Antenna TxDiv (SATD) and Beam Forming TxDiv (BFTD) are possible.

Figure 6:
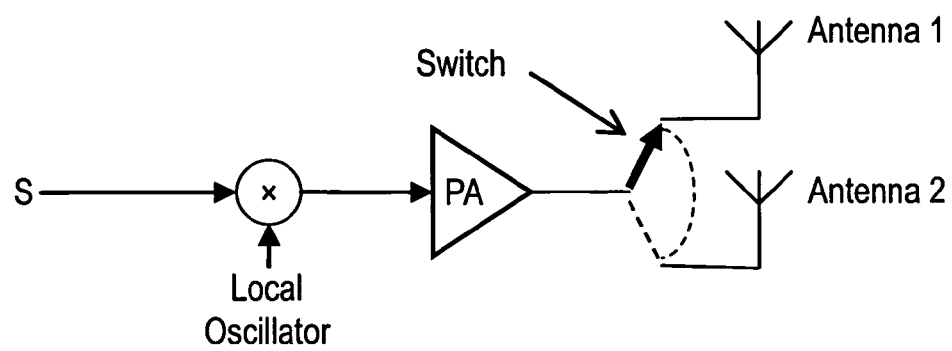
FIG. 6 illustrates schematically an embodiment of uplink Switched Antenna Transmission Diversity.

FIG. 6 illustrates schematically an embodiment of uplink Switched Antenna Transmission Diversity. In SATD, user equipment can only transmit via one antenna at a time and hence the possible values for $W_1$ and $W_2$ are 1 or 0. This avoids having an additional costly power amplifier (PA) in the UE. The weights are only logical representation but from an implementation point of view, a simple switch as shown in FIG. 6. Therefore, for SATD, the index size N is 2, which can be indicated with only 1 bit.

In BFTD, a codebook or look up table comprising a set of predetermined relative weights is used. In close loop TxDiv, a base station operates to select the best predetermined weights based on radio channel estimations.

For user equipment having a two transmit branch, only the phase difference between the weight vectors affect the gains. An example implementation is to fix the value of one weight, i.e. $W_1(n)$ and vary the phase of the other weight, i.e. $W_2(n)$ in relation to $W_1(n)$.

Figure 7:
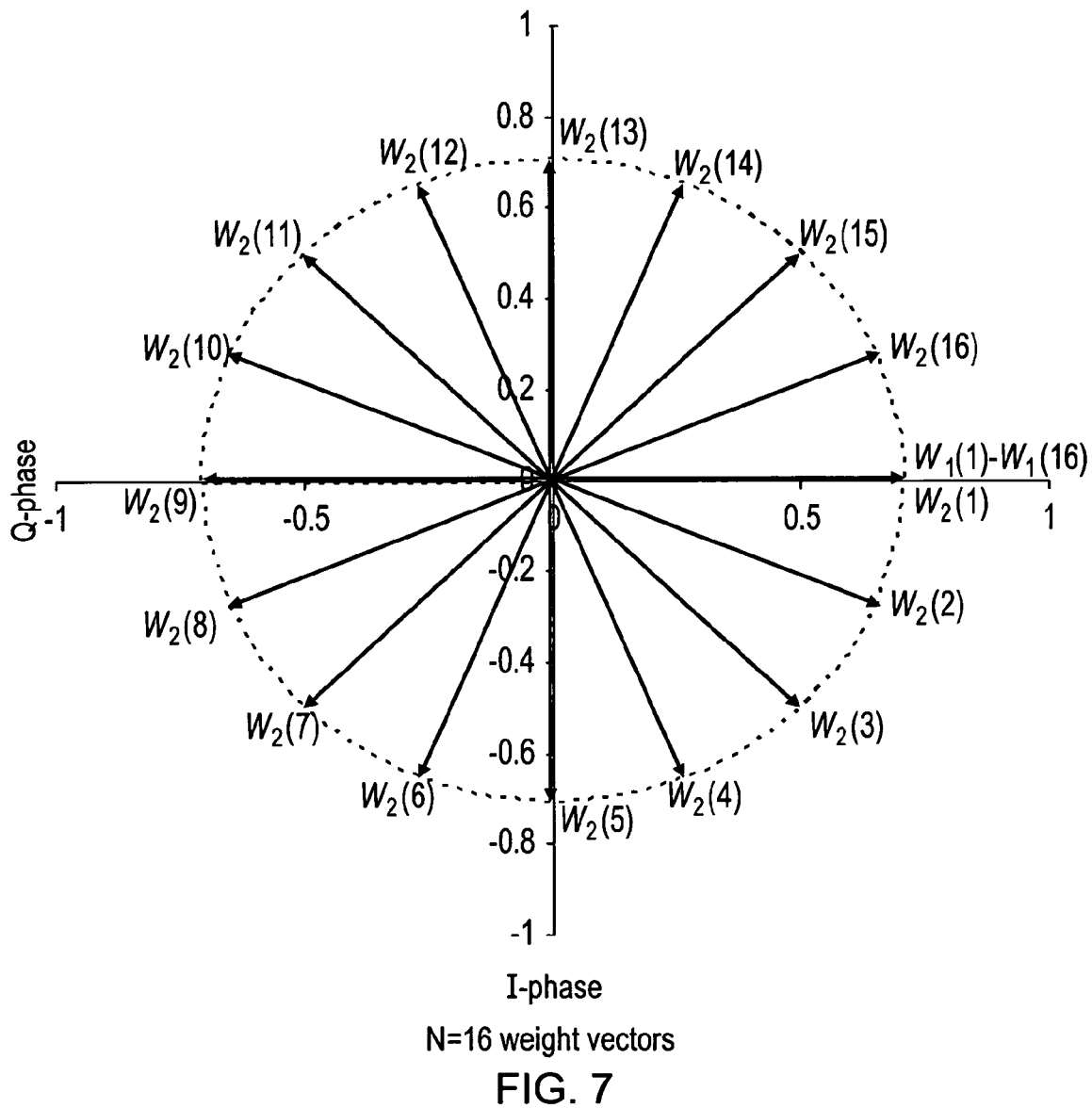
FIG. 7 illustrates schematically a set of transmission antenna weights according to one embodiment.

FIG. 7 illustrates schematically a set of transmission antenna weights according to one embodiment. The codebook shown in FIG. 7 is a N=16 codebook in which the first weight $W_1(n)$, is fixed for n=1 to 16 whilst the phase for the second weight varies.

A non-codebook BFTD can be implemented for open loop TxDiv in which the first weight is fixed and the phase of the second weight, $\phi$ changes by $\pm\delta$, the instruction to change up or down by an increment of phase being issued by a base station to user equipment.

Figure 8:
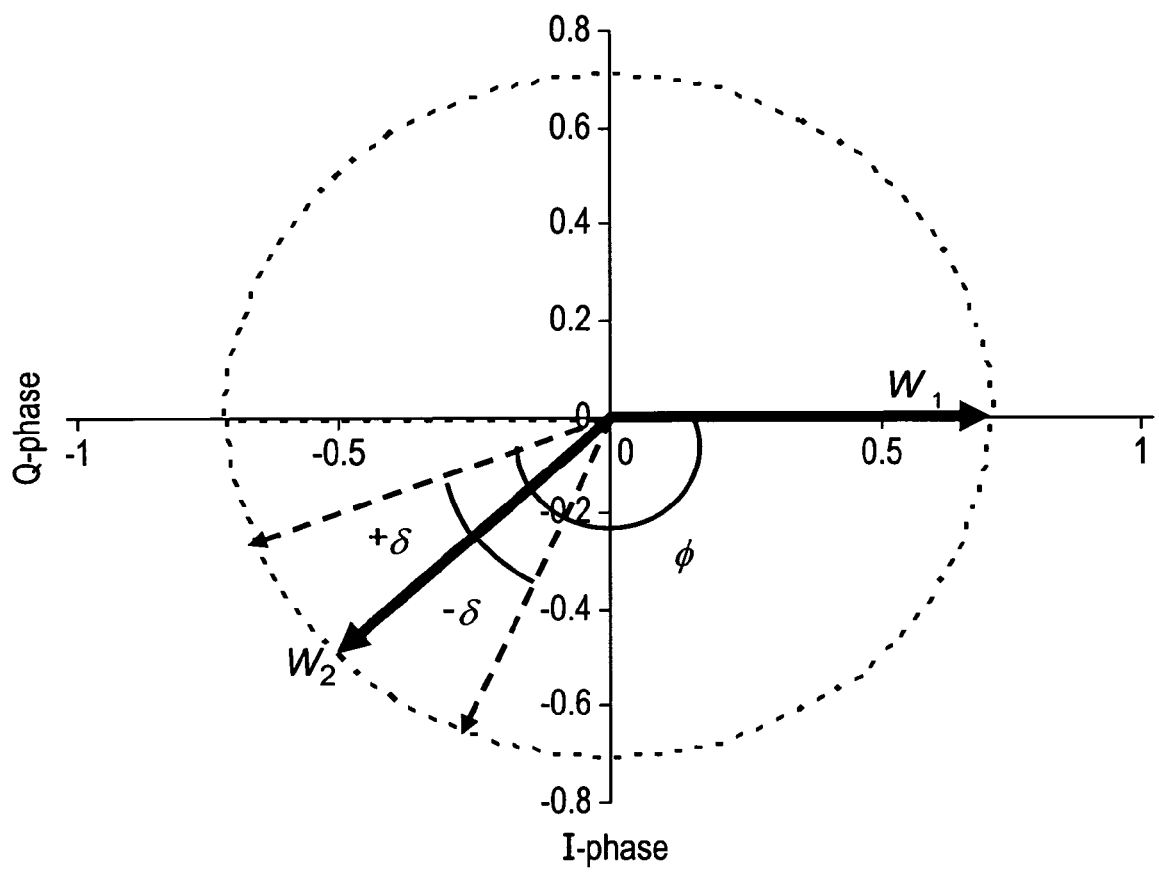
FIG. 8 illustrates schematically a set of transmission antenna weights according to one embodiment.

FIG. 8 illustrates schematically a set of transmission antenna weights according to one embodiment, for a 2 branch uplink TxDiv capable user equipment. In the embodiment illustrated, a first weight is denoted as $W_1$ and is fixed. The phase between $W_1$ and the second weight $W_2$ is $\phi$, where $\phi$ can increase or decrease by $\delta$ changing $W_2$ to the dashed vectors shown in FIG. 8. In some, open loop, solutions, the UE decides whether to increase or decrease the phase $\phi$ by $\delta$ based on the TPC. For a close loop solution, a base signals to user equipment to increase or decrease the phase $\phi$ by $\delta$ based on uplink radio channel estimation.

Compromise Weight

In SATD and BFTD, each cell (or NB) in the Active Set of user equipment is expected to transmit a transmission weight feedback request or indication to the user equipment, that request indicating the preferred transmit antenna or the preferred weight according to that base station. Described aspects allow user equipment to derive a "compromise" weight that benefits as many cells as possible based on the feedbacks from all the cells within the user equipment Active Set.

In SATD, a cell or base station needs only indicate the preferred antenna and a simple "compromise" scheme can be used, whereby the user equipment chooses the antenna that the majority of cells (or NB) prefers. This will cause the UE to select the antenna that benefits the most cells.

In BFTD, user equipment using a weight other than a "preferred" base station requested weight reduces the gain that can be achieved by the network as a whole. In some cases, the UE using the wrong weight can cause a loss compared to not using an uplink transmission diversity scheme.

Most generally, let the loss in using the wrong weight $L_{WEIGHT}$ in dB be:

$$L_{WEIGHT} = G_0 - G_X \quad \text{Equation 2}$$

Where:

$G_0$ is the gain (dB) in using the preferred weight $G_X$(dB) is the gain in using a weight other than the preferred weight.

Assuming the indexing correlates to resulting phase shifts, it is also possible to generally define an index distance $D_{INDEX}$ as:

$$D_{INDEX} = n_X - n_0 \quad \text{Equation 3}$$

Figure 9:
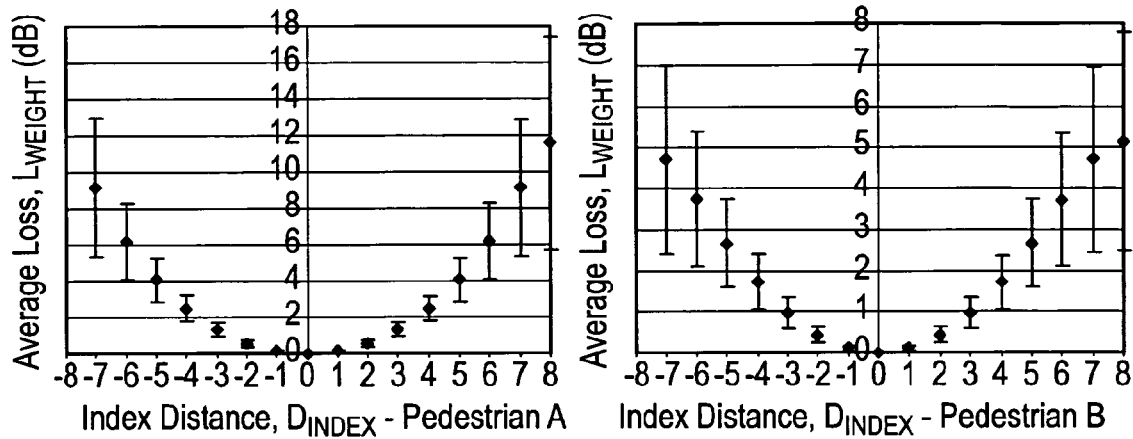
FIG. 9 and FIG. 10 are plots of average loss $L_{WEIGHT}$ against the index distance $D_{INDEX}$ according to a first model.
Figure 10:
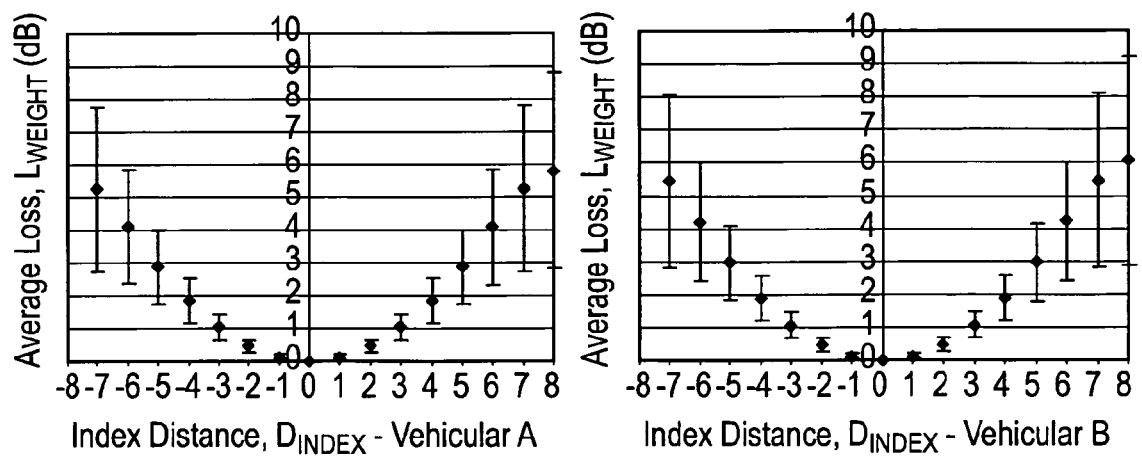

Where:

$n_X$ is the weight indicated by index n used by the UE $n_0$ is the NB preferred weight indicated by index n FIG. 9 and FIG. 10 are plots of average loss $L_{WEIGHT}$ vs. the index distance $D_{INDEX}$ for Pedestrian (A&B) and Vehicular (A&B) radio channels respectively based on simulations.

In the plots of FIG. 8 and FIG. 9 the simulations use the codebook shown schematically in FIG. 7 having a codebook size N=16. The plots show that the loss increases as the index distance increases and the loss is independent of the direction of change of the index. The index distance is proportional to the difference in the weight vectors $\Delta w$, therefore the loss is dependent upon the difference between the weight vector used by the UE and the NB preferred weight vector (i.e. $\Delta w$).

The $L_{WEIGHT}$ standard deviation (indicated by vertical lines in FIG. 9 and FIG. 10) also increases as the index distance $D_{INDEX}$, increases (in either direction). This means the uncertainty of the loss increases with index distance $D_{INDEX}$.

To determine a suitable compromise weighting, the compromise weights used should minimise the differences in weight vectors $\Delta w$. In one embodiment, minimization of the differences in weight vectors can be achieved using a MMSE (Minimum Mean Squared Error). Other distance minimization techniques for $\Delta w$ may also be used.

Figure 11:
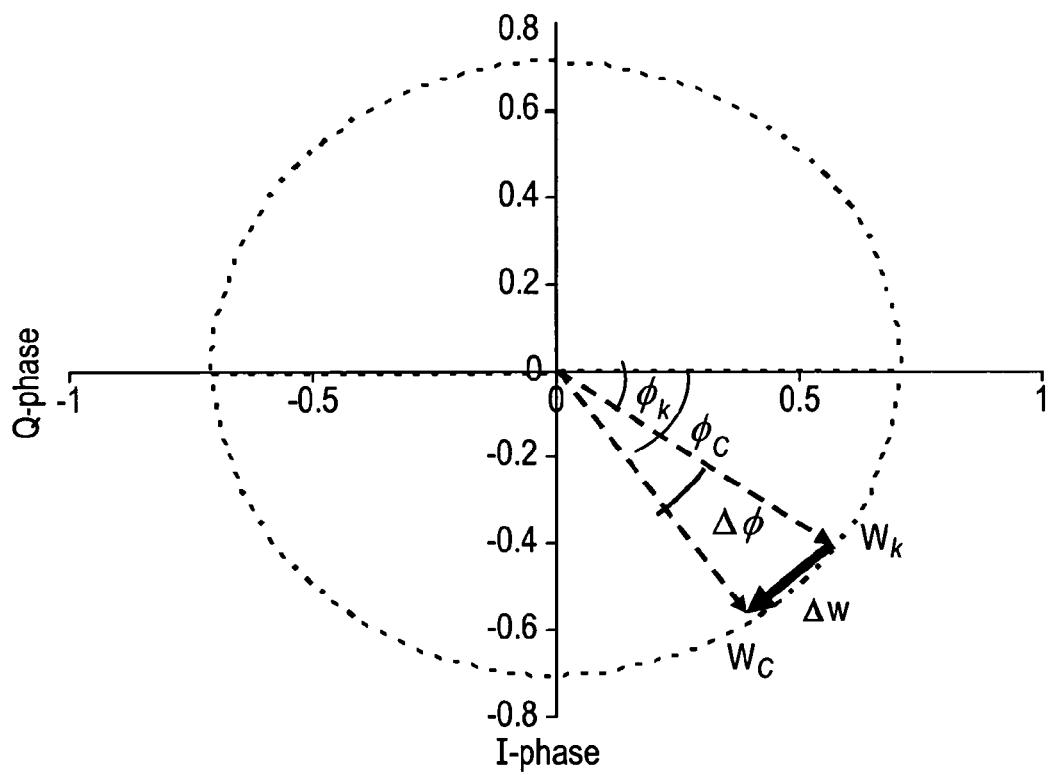
FIG. 11 illustrates schematically a difference in weighting vectors.

FIG. 11 illustrates schematically a difference in weighting vectors. FIG. 11 shows $\Delta w$, for a 2 branch TxDiv system, where the $1^{st}$ weight is constant. Hence, here $\Delta w$ represents the difference in distance between two $2^{nd}$ weight vectors, $W_k$ is the weight vectors selected by cell k and $W_C$ be the "compromise" weight vectors used by the UE.

The MSE (Mean Squared Error) $E_{MSE}$ is given by:

$$E_{MSE} = \frac{1}{K}\sum_{k=1}^{K}(W_k - W_C)^2 \qquad \text{Equation 4}$$

The MMSE is found by minimizing $E_{MSE}$ with respect to $W_C$ and is given by:

$$-\frac{2}{K}\sum_{k=1}^{K}(W_k - W_C) = 0 \qquad \text{Equation 6}$$

$$W_C = \frac{1}{K}\sum_{k=1}^{K} W_k$$

In one embodiment, the compromise weights may be found by averaging all the weights received from cells within the Active Set. Calculation of $W_C$ may result in a weight vector that is not within the codebook. If the user equipment is restricted to use weights defined in the codebook then, $W_C$ needs to be quantized to the nearest weight vector in the codebook. In some embodiments, it is possible for user equipment to use a non-quantised $W_C$.

In FIG. 11, $\phi_k$ is the phase for vector $W_k$, $\phi_C$ is the phase for vector $W_C$ and $\Delta\phi$ is the difference in phase between $W_k$ and $W_C$. It is noted that $\Delta\phi$ is proportional to $\Delta w$ and minimizing $\Delta\phi$ minimizes $\Delta w$. Since $\Delta\phi$ is also linearly proportional to the index difference $D_{INDEX}$, an alternate solution is to find the weight or index n that minimizes $D_{INDEX}$. An example of this is to take the average of the index $n_k$ indicated by all the cells in the user equipment Active Set. However, using this method, the "wrap around" of the phase $\phi$ needs to be taken account.

Figure 12:
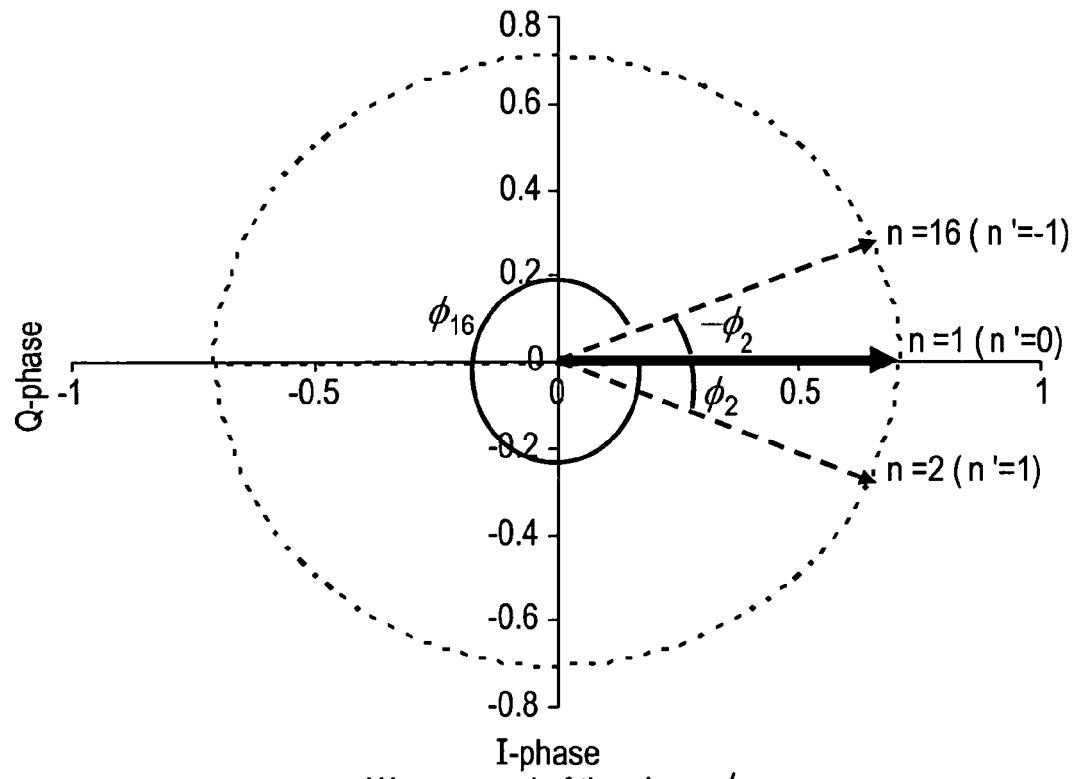
FIG. 12 illustrates the wrap around of codebook phase differences.

FIG. 12 illustrates the wrap around of codebook phase differences. The weight vectors are usually vectors within a circle (or sphere for 3D vectors). The phase $\phi$, in radians, ranges from 0 to $2\pi$ viewed in a clockwise direction from the I-phase (real axis) and it ranges from 0 to $-2\pi$ viewed in a counter clockwise direction. In FIG. 12, in an embodiment having a codebook size N=16, the phase for index n=2 is $\phi_2$ whilst that of index n=16 is $\phi_{16}$. The phase for index n=16 can also be $-\phi_2$ and either value used ($\phi_{16}$ or $-\phi_2$) would give the same gain as both points to the same vector (n=16). However, the index number n does not share the same property, for example, in a codebook size N=16, the number 16 is not the same as the number $-2$. If a compromise index $n_C$ is found using the average of $n_k$, then this wrap around needs to be taken into account.

In a non-codebook based BFTD, each cell (or base station) indicates whether it prefers to increase or decrease the phase $\phi$ by $\delta$. Since the loss $L_{WEIGHT}$ is minimized if the difference between the preferred phase and compromise phase (i.e. UE selected phase) is minimized, a similar MMSE approach can be used to find a compromise phase change $\delta_C$, which is the average $\delta$. That is:

$$\delta_C = \frac{1}{K}\sum_{k=1}^{K}\delta_k \qquad \text{Equation 7}$$

Where:

$\delta_k$ is NB k's preferred phase change and it can take the value $+\delta$ or $-\delta$.

If the user equipment can only increase the phase $\phi$ by $\delta$ step, then in one embodiment, the implemented compromise weight calculation method is similar to that in SATD where the user equipment chooses $+\delta$ or $-\delta$ depending on the majority.

In some embodiments, it is possible for user equipment to change its phase $\phi$ by a fraction (or non-integer multiple) of $\delta$. In this case, the user equipment may apply the value $\delta_C$ calculated in Equation 7 directly to $\phi$.

The compromise weight methods described above are also applicable for TxDiv with more than 2 branches. The use of majority vote for SATD can be easily expanded for higher number of antennas.

For BFTD, the MMSE (e.g. average) of the index in Equation 6 is directly applicable for higher branches of TxDiv. For higher TxDiv branches in non-codebook based BFTD, each weight corresponding to an antenna would have its own compromise weight. That is:

$$\delta_C(j) = \frac{1}{K}\sum_{k=1}^{K}\delta_k(j) \qquad \text{Equation 8}$$

Where:

$\delta_C(j)$ is the compromise weight for antenna j $\delta_k(j)$ is the preferred increment/decrement of the weight vector for antenna j from cell (or NB) k.

Here it is assumed that each base station will send the preferred phase increment/decrement for each weight vector corresponding to each antenna.

Weighted Average

In some embodiments, additional information can be factored when deriving the compromise weight.

Figure 13:
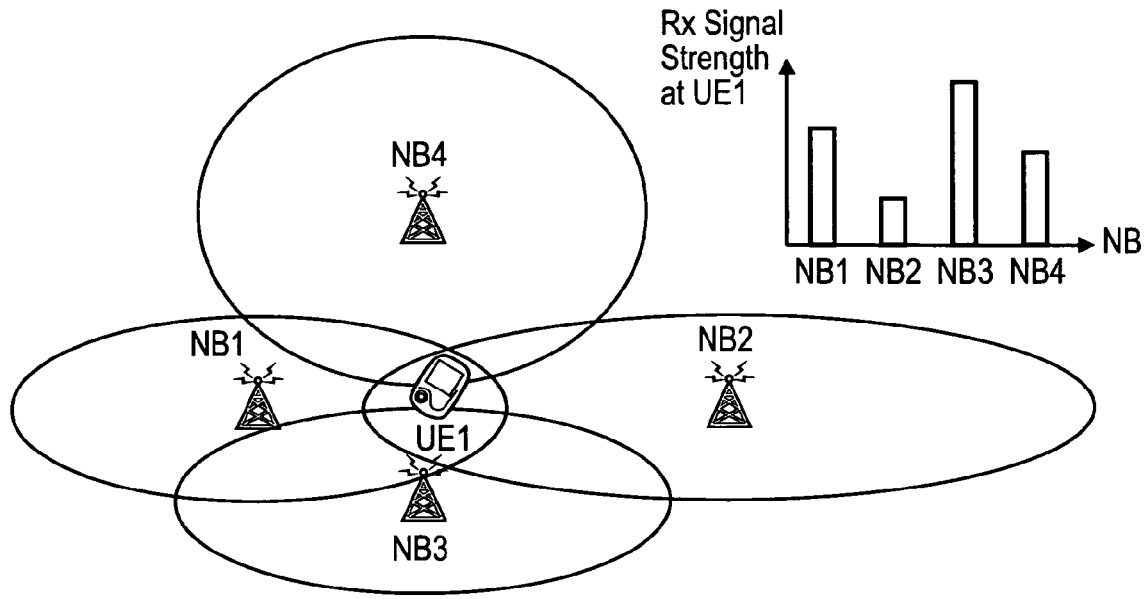
FIG. 13 illustrates schematically an active set of base stations for user equipment.

FIG. 13 illustrates schematically an active set of base stations for user equipment. UE1 has 4 cells (base stations) in its Active Set: NB1, NB2, NB3 and NB4. Due to the locations of the base stations, CPICH (Common Pilot Channel) signal strength received at the UE from each base station will be different in the downlink.

Furthermore, transmission from UE1 to each base station will experience different path losses. Since the influence of UE1 on each cell in its Active Set is different, changes to the Beam Forming Transmission Diversity weightings will have a different impact on each base station in the active set. Hence, higher priority should be given to the preferred weight of that base station that will experience the highest impact if user equipment changes its transmission weightings. A weighted average can therefore be used, in some embodiments, when deriving the compromise weight. Accordingly, a weight factor $\alpha_k$ can be included for each cell (base station) k in Equation 6 and Equation 7 as follows:

$$W_C = \frac{1}{K}\sum_{k=1}^{K}\alpha_k W_k \qquad \text{Equation 9}$$

$$\delta_C = \frac{1}{K}\sum_{k=1}^{K}\alpha_k \delta_k \qquad \text{Equation 10}$$

The factor $\alpha_k$, in Equation 9 and Equation 10, is dependent upon how much influence user equipment has on a NB. An indicator of influence may, in some embodiments, be the CPICH signal quality received by user equipment (e.g. power or Signal to Noise & Interference Ratio, SNIR) from each base station. For example in FIG. 13, the UE receives highest CPICH power from NB3, followed by NB1, NB4 and lastly NB2 and thus $\alpha_3 \geq \alpha_1 \geq \alpha_4 \geq \alpha_2$.

Factor $\alpha_k$ is also applicable to SATD embodiments. In such embodiments each base station's "vote" is multiplied by factor $\alpha_k$. Let function $F^k_{SATD}(j)$ be:

$$F^k_{SATD}(j) = \begin{cases} 1 & \text{if } NB\ k \text{ selects antenna} = j \\ 0 & \text{if } NB\ k \text{ selects antenna} \neq j \end{cases} \quad \text{Equation 11}$$

The compromise transmit branch (i.e. antenna) $j_C$ is therefore the value j such that the following equation is met:

$$\sum_{k=1}^{K} \alpha_k F^k_{SATD}(j_C) = \max_{j=1\ to\ M}\left(\sum_{k=1}^{K} \alpha_k F^k_{SATD}(j)\right) \quad \text{Equation 12}$$

where M is the total number of transmit branches.

In one embodiment, the weightings may be determined to give a higher value of weighting factor $\alpha_k$ to the serving cell. Such an approach is in line with the objective where a higher weight factor is given to NB that is influenced more by the UE. Since the serving cell receives essential information from the UE (e.g. HS-DPCCH that is only transmitted to the serving cell), a degradation in the receive signal due to choosing the wrong weight (or antenna) would results in higher impact to the system performance compared to that of a non-serving cell. In the extreme case, $\alpha_k=0$ if k is not the serving cell and 1 otherwise, which gives absolute priority to the serving-cell. The level of priority of the serving cell over the non-serving can be signalled to the UE by the network.

Other factors which influence the reception of the NB can also be used and the weighting need not be restricted to being calculated based upon received signal quality or whether a base station is a serving or non-serving cell.

In other words, embodiments allow a compromise transmission weightings to be used by user equipment utilizing transmission diversity, those compromise transmission weightings being derived in a manner which minimises differences between the compromise weightings and the preferred weights indicated by all cells within the Active Set of the user equipment.

In one embodiment, the compromise weight is found by using a MMSE technique where the differences in weight vectors is minimized. In one embodiment, the compromise weight is the average of all the preferred weights of the cells within the Active Set. In one embodiment the compromise weight is the MMSE or the average of a representation of the weights of the cells within the Active Set. This representation can be the phase or the index to the weight. In one embodiment the compromise weight is the weight that is the majority weight preferred by all cells in the Active Set. In one embodiment a factor that is proportional to the amount of influence a UE has over a NB (and vice versa) is applied to the compromise weight calculations.

Example 1

The power of a signal received from a base station at user equipment is dependent upon the path loss experienced between the base station and user equipment. The influence of a user equipment of the operation of a base station is dependent upon the strength of user equipment transmissions reaching the base station. Consequently, if NB1 receives a signal from user equipment having twice as much power as NB2, then the UE has twice as much influence over NB1 than it does to NB2. Accordingly, in this example the weight factor $\alpha_k$, described above, is proportional to the path loss.

Although path losses in the downlink and uplink can be different due to different carrier frequencies used in the downlink and uplink, the downlink path loss estimated from the CPICH power is a good indication of the uplink path loss. The path loss can therefore be considered proportional to the UE received CPICH power from NB k ($P_{k,CPICH}$ (in nW)).

The weight factor can thus be calculated according to:

$$\alpha_k = \frac{S_k P_{k,CPICH}}{\sum_{k}^{K} S_k P_{k,CPICH}} \quad \text{Equation 13}$$

Where: $S_k$ is 2 if k is the serving cell (otherwise it is 1).

Figure 14:
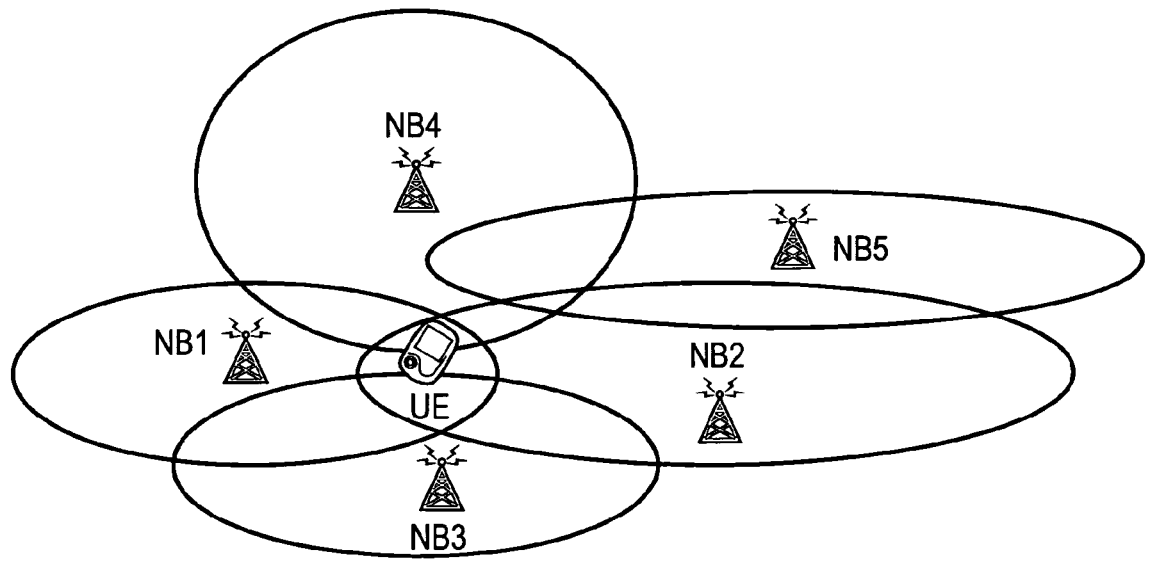
FIG. 14 illustrates schematically an arrangement of five base stations in an active set of example user equipment.

FIG. 14 illustrates schematically an arrangement of five base stations namely NB1, NB2, NB3, NB4 and NB5 where NB3 is the serving cell, in an active set of example user equipment UE. In this example, the serving cell is determined to have twice the influence in comparison with a non-serving cell. The received CPICH powers at user equipment UE from each base station and the corresponding weight factors $\alpha_k$ are summarised in Table 1.

TABLE 1

Weight factor $\alpha_k$ calculations for Example 1

| NB | $P_{k,CPICH}$ dBm | nW | $S_k$ | Factored Power (nW) | $\alpha_k$ |
|---|---|---|---|---|---|
| 1 | −90 | 0.0010 | 1 | 0.0010 | 0.1968 |
| 2 | −96 | 0.0003 | 1 | 0.0003 | 0.0494 |
| 3 | −88 | 0.0016 | 2 | 0.0032 | 0.6239 |
| 4 | −93 | 0.0005 | 1 | 0.0005 | 0.0986 |
| 5 | −98 | 0.0002 | 1 | 0.0002 | 0.0312 |
| Total | | | | 0.0051 | 1 |

Assuming that UE uses a two transmit branch SATD scheme. The NBs' preferred transmit branch (i.e. antenna) are as follows:

TABLE 2

Calculate compromise transmit branch

| NB | Preferred Tx Branch, $F^k_{SATD}(j)$ j = 1 | j = 2 | $\alpha_k$ | Tx Branch Weight Calculation j = 1 | j = 2 |
|---|---|---|---|---|---|
| 1 | 0 | 1 | 0.1968 | 0.000 | 0.197 |
| 2 | 1 | 0 | 0.0494 | 0.049 | 0.000 |
| 3 | 1 | 0 | 0.6239 | 0.624 | 0.000 |
| 4 | 0 | 1 | 0.0986 | 0.000 | 0.099 |
| 5 | 0 | 1 | 0.0312 | 0.000 | 0.031 |
| Total | | | | 0.673 | 0.327 |

Thus the compromise transmit branch based on the above calculation is $j_C=1$.

Example 2

The same example distribution of base stations as that shown in FIG. 14 is used for a second example. Again a UE Active Set contains 5 cells: NB1, NB2, NB3, NB4 and NB5 and NB3 is the serving cell. The UE employs a codebook based BFTD with index size N=8. The weight vectors are summarised in Table 3.

TABLE 3

Codebook weights N = 8

| Index n | Weight, $W_1$ | | Weight, $W_2$ | |
| --- | --- | --- | --- | --- |
| | I-Phase | Q-Phase | I-Phase | Q-Phase |
| 1 | 0.7071 | 0 | 0.7071 | 0.0000 |
| 2 | 0.7071 | 0 | 0.5000 | −0.5000 |
| 3 | 0.7071 | 0 | 0.0000 | −0.7071 |
| 4 | 0.7071 | 0 | −0.5000 | −0.5000 |
| 5 | 0.7071 | 0 | −0.7071 | 0.0000 |
| 6 | 0.7071 | 0 | −0.5000 | 0.5000 |
| 7 | 0.7071 | 0 | 0.0000 | 0.7071 |
| 8 | 0.7071 | 0 | 0.5000 | 0.5000 |

The weight factor is proportional to the CPICH receive power as in Equation 13 but in this example, no additional importance is given to the serving cell, i.e., $S_k=1$ for all k. The receive CPICH power and the corresponding weight factors $\alpha_k$ are summarised in Table 4.

TABLE 4

Weight factor $\alpha_k$ calculations for Example 2

| NB | $P_{k,CPICH}$ | | Additional Factors | | |
| --- | --- | --- | --- | --- | --- |
| | DBm | NW | $S_k$ | Factored Power (nW) | $\alpha_k$ |
| 1 | −90 | 0.0010 | 1 | 0.0010 | 0.1968 |
| 2 | −96 | 0.0003 | 1 | 0.0003 | 0.0494 |
| 3 | −88 | 0.0016 | 1 | 0.0016 | 0.3119 |
| 4 | −93 | 0.0005 | 1 | 0.0005 | 0.0986 |
| 5 | −98 | 0.0002 | 1 | 0.0002 | 0.0312 |
| Total | | | | 0.0035 | 0.6881 |

The NB preferred index $n_k$, its corresponding weight $W_2$ and compromise weight $W_C$ are calculated in Table 5 using Equation 9.

TABLE 5

Calculate compromise weight

| NB | Peferred Index, $n_k$ | Weight ($W_2$) | | $\alpha_k\square$ | Weighted Vector ($\alpha_k W_2$) | |
| --- | --- | --- | --- | --- | --- | --- |
| | | I-Phase | Q-Phase | | I-Phase | Q-Phase |
| 1 | 5 | −0.7071 | 0 | 0.2861 | −0.202275645 | 0 |
| 2 | 4 | −0.5 | −0.5 | 0.0719 | −0.035927632 | −0.03593 |
| 3 | 6 | −0.5 | 0.5 | 0.4534 | −0.226688034 | 0.226688 |
| 4 | 7 | 0 | 0.7071 | 0.1434 | 0 | 0.101378 |
| 5 | 8 | 0.5 | 0.5 | 0.0453 | 0.022668803 | 0.022669 |
| Average | | | | | −0.088444501 | 0.062961 |

Figure 15:
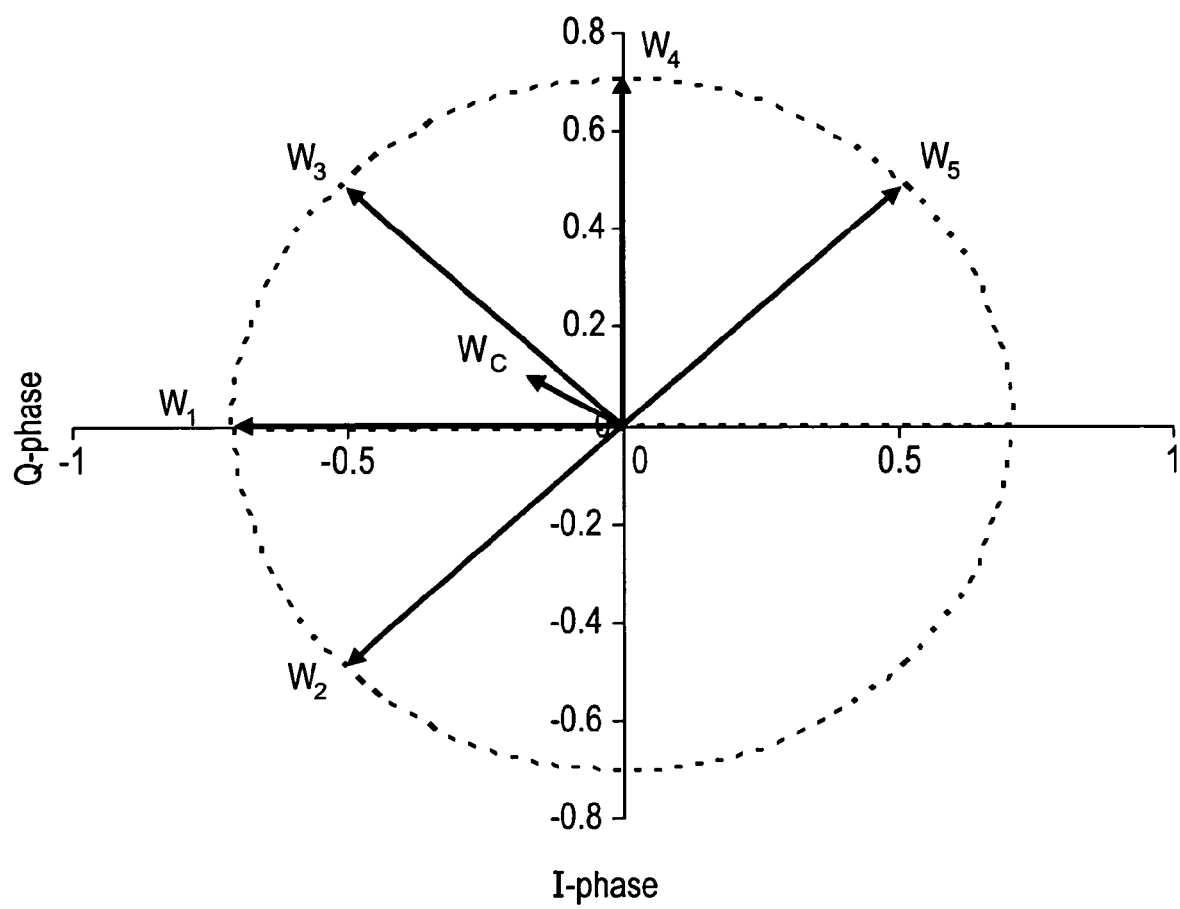
FIG. 15 illustrates a compromise weight vector calculated according to one embodiment.

The weight vectors of each NB $W_k$ and the corresponding calculated compromise weight $W_C$ are shown in FIG. 15. Here the UE can only select a weight that is within the codebook and quantising the compromise weight gives $W_C=W_2$ (6), which is the same weight used by NB3.

Example 3

The same example distribution of base stations as that shown in FIG. 14 is used for a third example. The UE Active Set contains 5 cells: NB1, NB2, NB3, NB4 and NB5 and NB3 is the serving cell. The UE employs a non-codebook based BFTD where $\delta=\pi/4$ (or 45°). The weight factor is proportional to the CPICH receive power as in Equation 13 but here there is no importance given to the serving cell, i.e., $S_k=1$ for all k. The receive CPICH power and the corresponding weight factor $\alpha_k$ is same as that in Table 4.

The NB preferred phase change and the compromise phase change, $\delta_C$ are calculated in Table 6 using Equation 10. Here the NB feedback a +1 or −1 to indicate a change of +δ and −δ respectively.

TABLE 6

Calculate compromise phase change

| NB | NB Preferred Phase Change | | $\alpha_k$ | Weighted Phase Change |
| --- | --- | --- | --- | --- |
| | Indicator, ±1 | Phase Change, ±δ(°) | | |
| 1 | +1 | 45 | 0.2861 | 12.87274319 |
| 2 | −1 | −45 | 0.0719 | −3.233486896 |
| 3 | +1 | 45 | 0.4534 | 20.40192305 |
| 4 | −1 | −45 | 0.1434 | −6.45165455 |
| 5 | −1 | −45 | 0.0453 | −2.040192305 |
| Average | | | | 4.3099 |

If the UE can apply a weight vector that can be a fraction of δ, then the phase changed by +4.3099°. If it cannot apply a fraction of δ, then the rounded phase change is 0° or no phase change.

Figure 16:
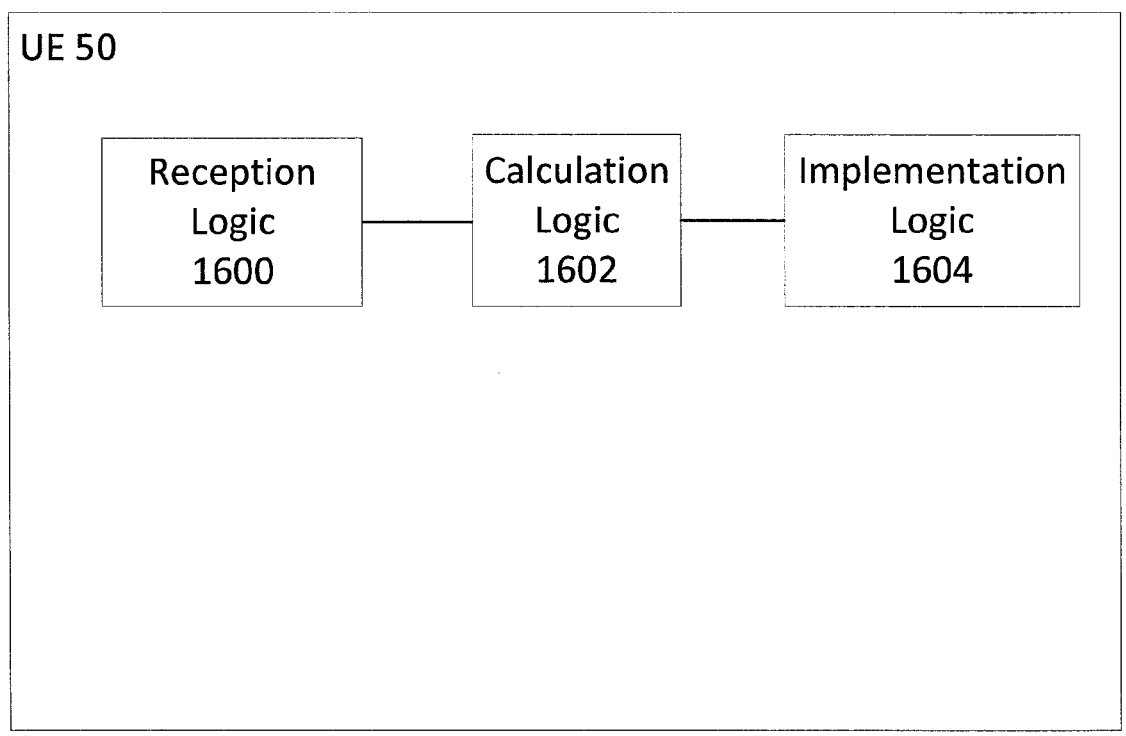
FIG. 16 illustrates an aspect of a user equipment.

FIG. 16 illustrates an aspect of a user equipment 50. In this aspect, the user equipment 50 includes reception logic 1600, calculation logic 1602, and implementation logic 1604.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of setting antenna transmission weightings of user equipment in a wireless telecommunication network, said user equipment being operable to transmit on at least two antennas and operable to communicate simultaneously with at least two base stations from an active set associated with said user equipment, said method comprising:
   receiving preferred antenna transmission weightings from said at least two base stations in said active set;
   calculating an indication of compromise antenna transmission weightings which minimise a difference between said indication of compromise antenna transmission weightings and said preferred antenna transmission weightings, said calculating further comprising assigning a weighting to said preferred antenna transmission weightings from each base station in said active set, said weighting being determined based upon an indication of a relative importance of each base station in said active set to operation of said user equipment within said wireless communication network; and,
   setting said antenna transmission weightings in accordance with said indication of compromise antenna transmission weightings;
   wherein said calculating comprises: minimising a mean squared distance between the indication of compromise antenna transmission weightings and the preferred antenna transmission weightings received from the base stations in said active set;
   wherein said preferred antenna transmission weightings comprises an indication of an amplitude shift between transmissions of a signal on said at least two antennas; and
   wherein said preferred antenna transmission weightings comprises an indication of antenna selection.

2. A method according to claim 1, wherein said calculating comprises: averaging the preferred antenna transmission weightings received from the base stations in said active set.

3. A method according to claim 1, wherein said calculating comprises: calculating a mode preferred antenna transmission weightings received from said base stations in said active set, thereby selecting a most requested weightings from available possible weightings.

4. A method according to claim 1, wherein said weighting is assigned based upon an indication of received pilot signal strength from said base stations in said active set at said user equipment.

5. A method according to claim 1, wherein said weighting takes account of which of said base stations in said active set is responsible for providing said user equipment serving cell.

6. A method according to claim 1, wherein said preferred antenna transmission weightings comprises an indication of relative phase shift between transmissions of a signal on said at least two antennas.

7. A non-transitory computer-readable medium operable, when executed on a computer, to perform the method of claim 1.

8. User equipment operable to set antenna transmission weightings in a wireless telecommunication network, said user equipment being operable to transmit using at least two antennas and operable to communicate simultaneously with at least two base stations in an active set associated with said user equipment, said user equipment comprising:
   reception logic operable to receive preferred antenna transmission weightings from said at least two base stations in said active set;
   calculation logic operable to calculate an indication of compromise antenna transmission weightings which minimise a difference between said indication of compromise antenna transmission weightings and said preferred antenna transmission weightings, said calculation logic being operable to assign a weighting to the preferred antenna transmission weightings from each base station in the active set, the weighting being determined based upon an indication of a relative importance of each base station in the active set to operation of the user equipment within the wireless telecommunication network; and
   implementation logic operable to set said antenna transmission weightings in accordance with said calculated indication of compromise antenna transmission weightings;
   wherein said calculation logic is further operable to: minimise a mean squared distance between the indication of compromise antenna transmission weightings and the preferred antenna transmission weightings received from the base stations in said active set;
   wherein said preferred antenna transmission weightings comprises an indication of an amplitude shift between transmissions of a signal on said at least two antennas; and
   wherein said preferred antenna transmission weightings comprises an indication of antenna selection.

* * * * *